United States Patent Office 3,526,320
Patented Sept. 1, 1970

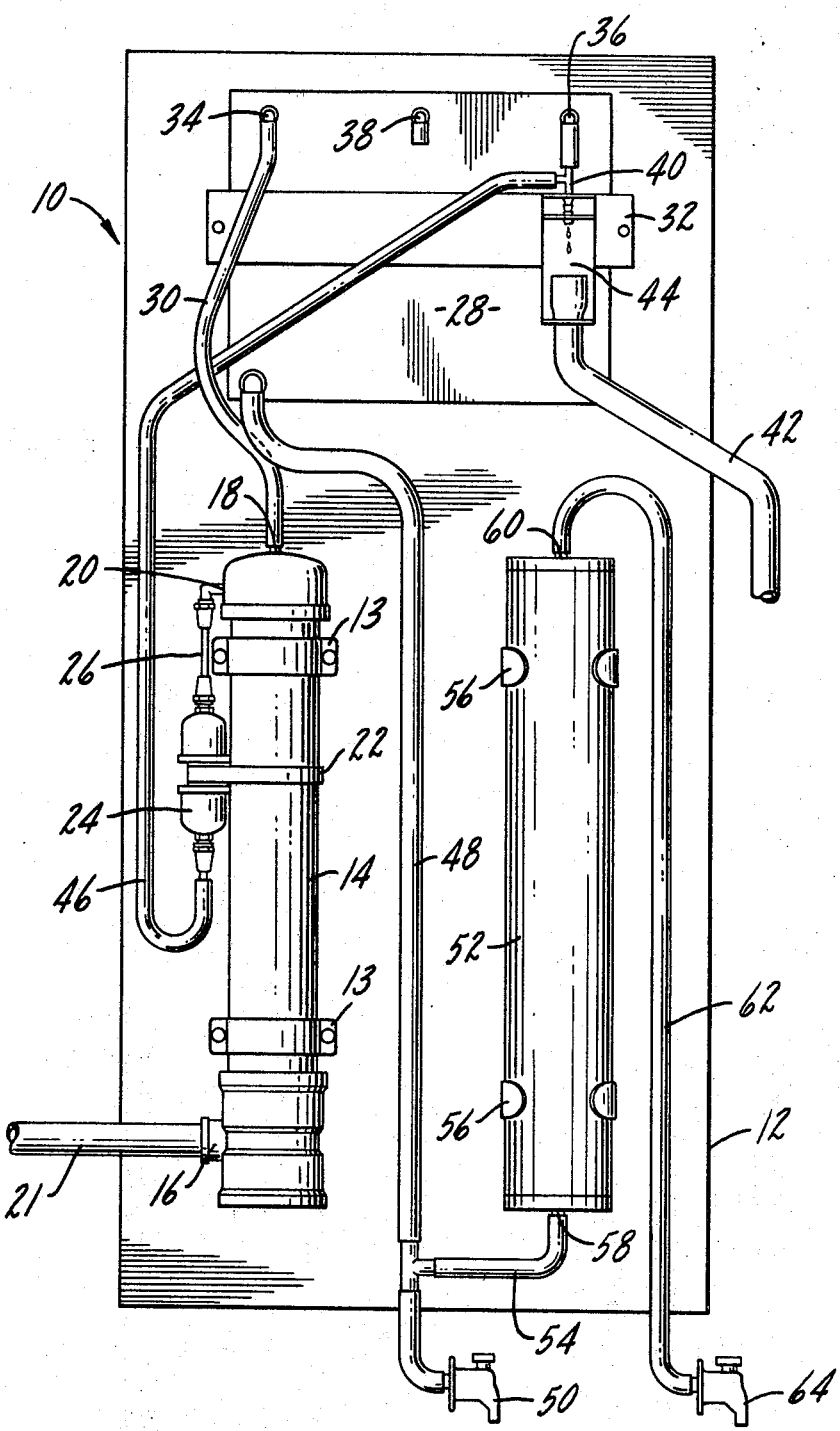

3,526,320
REVERSE OSMOSIS-ION EXCHANGE WATER PURIFICATION
Benjamin H. Kryzer, St. Paul, Minn., assignor, by mesne assignments, to Union Tank Car Company, Chicago, Ill., a corporation of Delaware
Filed Jan. 18, 1968, Ser. No. 698,783
Int. Cl. B01d 31/00
U.S. Cl. 210—254                5 Claims

ABSTRACT OF THE DISCLOSURE

Water is purified by conducting it through a semipermeable membrane to remove impurities by reverse osmosis, storing the water, and selectively utilizing the stored water or conducting it through an ion exchange resin module. Water that has passed through the ion exchange resin will be more pure than that which has passed only through the semi-permeable membrane. The invention also provides apparatus including suitable reverse osmosis means, a water storage tank, and ion exchange resin means, connected in series by suitable pipe means. Means are provided for withdrawing water directly from the storage tank, optionally bypassing the ion exchange resin, and avoiding unnecessary exhaustion.

---

The present invention relates to improvements in the art of purifying water, and more specifically to an improved method and apparatus for removing impurities from water by reverse osmosis and ion exchange.

There is often a need, especially in the laboratory, for very pure water. On the other hand, in many applications the water need not be extremely pure, so long as the majority of the dissolved contaminants have been removed. While reverse osmosis can remove the majority of dissolved and undissolved contaminants from water, it is not the preferred method for producing extremely pure water. The removal of substantially all impurities from water by reverse osmosis would require relatively high pressures, while only a small portion of the water would be passed through the membrane. It is therefore an uneconomical procedure. The use of ion exchange resins is best for producing such extremely pure water. However, ion exchange resins are expensive in that they must be replaced or regenerated when they become exhausted. Resins are therefore somewhat impractical for overall laboratory use.

Generally the present invention provides a method for purifying water wherein the water is conducted through a semi-permeable membrane to remove the majority of the dissolved and undissolved impurities by reverse osmosis. At least a portion of the water is then stored, where it may be selectively withdrawn for use or conducted through ion exchange resin in order to remove any remaining ionic impurities.

The present invention also provides apparatus for carrying out the aforementioned method, the apparatus including reverse osmosis means having a water supply inlet, a hard water outlet, and a purified water outlet, along with ion exchange resin means including a water inlet, a water outlet, and ion exchange resin therebetween. Finally, the apparatus includes storage means having an inlet and an outlet, the storage inlet communicating with the purified water outlet of the reverse osmosis means, and the storage outlet communicating with the water inlet of the ion exchange means. Preferably, the storage means are located above the water outlet of the ion exchange means in order to permit the water to be fed through the ion exchange means under the force of gravity.

The invention, both as to its organization and method of operation, together with the objects and advantages thereof, will be best understood from the following detailed description taken in conjunction with the drawing, which is an elevation view of a preferred embodiment of the present invention.

As previously mentioned, the method of the present invention comprises conducting water through a semipermeable membrane to remove impurities by reverse osmosis. At least a portion of the water is stored after it has passed through the membrane, and at least a portion of the stored water is selectively conducted through ion exchange resin.

As is well known in the art, semi-permeable membranes suitable for reverse osmosis fall into several categories depending upon the type of contaminants that are to be removed. Membranes are available to retard the passage of only relatively large, uncharged molecules, or to retard cations or anions. Although any type of membrane may be employed in the present invention, depending upon the impurities to be removed from the water, it is preferred to employ a membrane that retards the passage of anions and cations as well as dissolved and suspended nonionic impurities as are found in ordinary tap water. The stored water, which is relatively pure, can then be selected when highly purified water is not required, avoiding the unnecessary exhaustion of the ion exchange resin.

The stored water may also be conducted through the ion exchange resin, where it will be further purified. As is well known in the art, ion exchange resin may be obtained in either the "softening" type or the "demineralizing" type. The "softening" type exchanges non-precipitate-forming ions such as sodium for the "hardness" ions, primarily as calcium and magnesium. The "demineralizing" type of resins, which is clearly preferred in the present invention, exchanges hydrogen or hydroxide ions for those removed from the water. These resins are available in strong and weak acid hydrogen form as well as strong and weak base hydroxide form. Any of the four may be utilized, depending upon the ions to be removed from the water and the desired pH of the treated water. In the preferred embodiment, both hydrogen- and hydroxide-form resins are employed, either mixed or in series to remove both anionic and cationic impurities. In the most preferred embodiment, all four forms are used in series to produce effluent water of nearly neutral pH.

Referring to the drawing, the preferred embodiment of the present invention comprises water purification apparatus generally indicated by reference numeral 10. The apparatus shown is of a type suitable for a chemical laboratory and includes a baseboard 12 which is suitable for wall mounting in a vertical position. Secured on a lower portion of the baseboard 12 by brackets 13 is a reverse osmosis module 14 having a raw water inlet opening 16, a purified water outlet 18, and a hard water outlet 20. The raw water inlet opening 16 communicates with a supply pipe 21. Attached to the side of the reverse osmosis module 14 by a strap 22 is a flow restrictor 24, communicating with the hard water outlet 20 by a pipe section 26. As is well known in the art, a flow restrictor 24 is essential to provide sufficient pressure on the hard water side of the membrane for the reverse osmosis process to take place.

Purified water from the reverse osmosis module 14 is conducted to a water storage tank 28 through a suitable pipe 30. As shown in the drawing, the water storage tank 28 is secured to an upper portion of the baseboard 12 by a mounting bracket 32. At the upper portion of the storage tank 28 are a water inlet 34, an overflow outlet 36, and an air vent 38. Partially purified water from the reverse osmosis module 14 is conducted to the water storage tank 28 through the pipe 30, communicating with the water inlet 34. Air displaced as the storage tank is filled or emptied is vented through the air vent 38.

The reverse osmosis module is preferably run continuously, so that after the tank 28 is filled, and provided there is no demand for the water contained therein, the excess will flow out of the overflow outlet 36 through a pipe 40 to a drain pipe 42 communicating with drain means (not shown). Preferably, an air gap 44 is provided between the overflow outlet 36 and the drain pipe 42 in order to prevent the possibility of backsiphoning from the drain pipe 42 into the stroage tank 28. As shown in the drawing, the hard water outlet pipe 46 is connected to the flow restrictor 24 on the side of the reverse osmosis module 14 to conduct hard water from the module 14 to the pipe 40 communicating with the overflow outlet 36. The hard water is thus disposed of through the drain pipe 42 along with the overflow water from the storage tank 28.

Communicating with the storage tank 28 at a point near the bottom thereof is a semi-purified water outlet pipe 48 including faucet or valve means 50 at the bottom end thereof. It can be seen that liquid withdrawn from the valve means 50 will have passed through the reverse osmosis module 14, and will therefore have most of the impurities removed.

An ion exchange resin module 52 is mounted on the baseboard 12 at a point below the water storage tank 28 for reasons that will hereinafter appear. Water from the semi-purified water outlet pipe 48 is conducted to the bottom of the ion exchange resin module 52 through a connecting pipe 54. The ion exchange resin module 52 is filled with ion exchange resin, preferably of the hydrogen and hydroxide form, which removes ionic impurities from the water. The hydrogen- and hydroxide-form resins may be present either in a mixed bed or in separate beds, although the latter are preferred. A particularly preferred construction includes four beds in series, and in the following order: strong cationic exchange resin, strong anionic exchange resin, weak cationic exchange resin, and weak anionic exchange resin. Such a sequence provides purified water of nearly neural pH.

It is also often suitable to include a dye in the ion exchange resin which changes color as the resin is exhaused. In the embodiment shown, the ion exchange resin module 52 is mounted on the baseboard 12 by snap brackets 56 which allow the simple removal of exhausted ion exchange resin modules and their replacement with fresh ones.

The connecting pipe 54 communicates with the inlet opening 58 on the bottom of the ion exchange resin module 52. Under the pressure of the hydrostatic head of water maintained in the storage tank 28, water passes upwardly through the ion exchange resin module 52 to a water outlet opening 60, and into a fully purified water outlet pipe 62. Faucet or valve means 64 communicate with the bottom end of the purified water outlet pipe 62. It will be seen that by maintaining the valve means 64 on the fully purified water outlet pipe 62 below the level of the water storage tank 28, water may easily be withdrawn through the ion exchange resin module 52 under the force of gravity alone, thus providing a relatively simple apparatus.

In operation, the raw water inlet pipe 16 is connected to a suitable water source, and water is delivered to the reverse osmosis module 14. It is essential that this water be supplied at a pressure sufficient for the reverse osmosis process to take place. If ordinary line pressure is insufficient, a pump (not shown) may be employed to boost the pressure. Hard water, which will be enriched in impurities, passes out the hard water outlet 20, through the flow restrictor 24 and the hard water outlet pipe 46 to the drain pipe 42 where it is disposed of. Purified water from the reverse osmosis module 14 passes out the purified water outlet 18 through the pipe 30 to the water inlet 34 of the water storage tank 28. The tank 28 fills, any excess passing to the drain pipe 42 through the overflow outlet 36.

If water of a semi-purified nature is required, it may be withdrawn from the water storage tank 28 opening the valve means 50 at the lower end of the semi-purified water outlet pipe 48. On the other hand, if water of a very pure nature is required it is withdrawn from the apparatus 10 by opening the valve means 64 at the bottom of the fully purified water outlet pipe 62. Because the water storage tank 28 is located above the ion exchange resin module 52, water will pass through the module 52 under the force of gravity.

While the embodiments described herein are at present considered to be preferred, it will be understood that various modifications and improvements may be made therein and it is intended to cover in the appended claims all such modifications and improvements as fall within the true spirit and scope of the invention.

I claim:

1. Laboratory water purification apparatus comprising: a baseboard adapted for vertical mounting; a reverse osmosis module mounted on a lower portion of said baseboard, said reverse osmosis module having a water inlet, a hard water outlet communicating with a drain, and a purified water outlet; a water storage tank mounted on an upper portion of said baseboard, said water storage tank indicating a water storage inlet and outlet, an overflow outlet, and an air vent, said water storage inlet communicating with said purified water outlet of said reverse osmosis module, and said overflow outlet communicating with drain means; an ion exchange resin module mounted on a lower portion of said baseboard, said ion exchange resin module including a water inlet, a water outlet, and hydrogen- and hydroxide-form ion exchange resin between said inlet and outlet, said water inlet of said ion exchange resin module communicating with said water storage outlet; a semi-purified water outlet between said water storage outlet and said water inlet of said ion exchange resin module, said semi-purified water outlet including a valve operable to withdraw water from said water storage tank; and a fully purified water outlet communicating with said water outlet of said ion exchange resin module, said fully purified water outlet including a valve operable to withdraw water from said storage tank through said ion exchange resin module.

2. Laboratory water purification apparatus comprising: a reverse osmosis module having a water inlet, a hard water outlet communicating with a drain, and a purified water outlet; a water storage tank including a water storage inlet and outlet, and an air vent, said water storage inlet communicating with said purified water outlet of said reverse osmosis module, an ion exchange resin module including a water inlet, a water outlet, and hydrogen and hydroxide-form ion exchange resin between said inlet and outlet, said water inlet of said ion exchange resin module communicating with said water storage outlet; a semi-purified water outlet between said water storage outlet and said water inlet of said ion exchange resin module, said semi-purified water outlet including a valve operable to withdraw water from said water storage tank; and a fully purified water outlet communicating with said water outlet of said ion exchange resin module, said fully purified water outlet including a valve operable to withdraw water from said storage tank through said ion exchange resin module.

3. Laboratory water purification apparatus comprising: a reverse osmosis module having a water inlet, a hard water outlet communicating with a drain, and a purified water outlet; a water storage tank including a water storage inlet and outlet, an overflow outlet, and an air vent, said water storage inlet communicating with said purified water outlet of said reverse osmosis module, and said overflow outlet communicating with drain means, an ion exchange resin module positioned below said water storage tank, including a water inlet, a water outlet, and hydrogen and hydroxide-form ion exchange resin between said inlet and outlet, said water inlet of said ion exchange resin module communicating with said water storage outlet; a semi-purified water outlet between said water storage outlet and said water inlet of said ion exchange resin module, said semi-purified water outlet including a valve operable to withdraw water from said water storage tank; and a fully purified water outlet communicating with said water outlet of said ion exchange resin module, said fully purified water outlet including a valve operable to withdraw water from said storage tank through said ion exchange resin module.

4. Laboratory water purification apparatus comprising: a baseboard adapted for vertical mounting; a reverse osmosis module mounted on said baseboard, said reverse osmosis module having a water inlet, a hard water outlet communicating with a drain, and a purified water outlet; a water storage tank mounted on said baseboard, said water storage tank including a water storage inlet and outlet, and an overflow outlet, said water storage inlet communicating with said purified water outlet of said reverse osmosis module, and said overflow outlet communicating with drain means, an ion exchange resin module mounted on said baseboard, said ion exchange resin module including a water inlet, a water outlet, and hydrogen and hydroxide-form ion exchange resin between said inlet and outlet, said water inlet of said ion exchange resin module communicating with said water storage outlet; a semi-purified water outlet between said water storage outlet and said water inlet of said ion exchange resin module, and semi-purified water outlet including a valve operable to withdraw water from said water storage tank; and a fully purified water outlet communicating with said water outlet of said ion exchange resin module, said fully purified water outlet including a valve operable to withdraw water from sad storage tank through said ion exchange resin module.

5. Laboratory water purification apparatus comprising: a reverse osmosis module having a water inlet, a hard water outlet communicating with a drain, and a purified water outlet; a water storage tank including a water storage inlet and outlet, an overflow outlet, said water storage inlet communicating with said purified water outlet of said reverse osmosis module, and said overflow outlet communicating with drain means, an ion exchange resin module including a water inlet, a water outlet, and hydrogen and hydroxide-form ion exchange resin between said inlet and outlet, said water inlet of said ion exchange resin module communicating with said water storage outlet; a semi-purified water outlet between said water storage outlet and said water inlet of said ion exchange resin module, said semi-purified water outlet including a valve operable to withdraw water from said water storage tank; and a fully purified water outlet communicating with said water outlet of said ion exchange resin module, said fully purified water outlet including a valve operable to withdraw water from said storage tank through said ion exchange resin module.

References Cited
UNITED STATES PATENTS

| | | | |
|---|---|---|---|
| 683,061 | 9/1901 | Nordtmeyer | 210—249 X |
| 1,825,631 | 9/1931 | Horvath | 210—321 X |
| 3,390,773 | 7/1968 | Merten | 210—321 X |
| 3,397,785 | 8/1968 | Jarvis et al. | 210—125 |

OTHER REFERENCES

"Reverse Osmosis," a publication of General Dynamics, General Atomics Division, May 1967, 6 pages.

REUBEN FRIEDMAN, Primary Examiner

F. A. SPEAR, Jr., Assistant Examiner

U.S. Cl. X.R.

210—257, 262, 321